United States Patent
Wang

(10) Patent No.: US 7,044,791 B2
(45) Date of Patent: May 16, 2006

(54) SHIELED OPTICAL-ELECTRIC CONNECTOR

(75) Inventor: Ning Wang, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/001,161

(22) Filed: Nov. 30, 2004

(65) Prior Publication Data

US 2005/0124220 A1     Jun. 9, 2005

(30) Foreign Application Priority Data

Dec. 6, 2003  (CN) ...................... 200320120348 A

(51) Int. Cl.
*H01R 13/648*     (2006.01)

(52) U.S. Cl. ...................... 439/607; 439/620
(58) Field of Classification Search ................ 439/607, 439/620; 385/92
See application file for complete search history.

(56) References Cited

U.S. PATENT DOCUMENTS

| 6,050,854 A | 4/2000 | Fang et al. |
|---|---|---|
| 6,190,205 B1* | 2/2001 | Wu ............................ 439/607 |
| 6,439,916 B1* | 8/2002 | Kuo ........................... 439/362 |
| 6,475,001 B1 | 11/2002 | Ohbayashi et al. |
| 6,588,947 B1 | 7/2003 | Minr |
| 6,607,308 B1* | 8/2003 | Dair et al. .................... 385/92 |
| 6,682,368 B1* | 1/2004 | Murr et al. ................. 439/607 |
| 6,783,398 B1* | 8/2004 | Slack et al. ................. 439/620 |
| 6,848,943 B1* | 2/2005 | Machado et al. ........... 439/620 |
| 2005/0020140 A1* | 1/2005 | Zhang et al. ............... 439/668 |

* cited by examiner

*Primary Examiner*—Tho D. Ta
*Assistant Examiner*—Vanessa Girardi
(74) *Attorney, Agent, or Firm*—Wei Te Chung

(57) ABSTRACT

An optical-electric connector (1) includes an insulating housing (20), a number of terminals (30), an optical-electric converter (50) and a shielding shell (10). The insulating housing (20) defines a mating face (230) having a mating hole (231) thereon, a receiving room (25) communicating with the mating hole and a number of terminal slots (27) receiving the terminals. The optical-electric converter is assembled in the insulating housing. The shielding shell substantially encloses the insulating housing and comprises a grounding tab (12) extending from an upper face thereof.

14 Claims, 6 Drawing Sheets

SHIELED OPTICAL-ELECTRIC CONNECTOR

BACKGROUND OF THE INVENTION

1. Field of the Invention

The present invention generally relates to a connector, and particularly relates to an optical-electric connector which has a shielding shell.

2. Description of Prior Arts

Miniaturized audio visual apparatuses such as a DVD (Digital Versatile Disk) player/recorder, MD (Mini-Disk) player/recorder, etc., portable audio apparatuses such as an MD portable player/recorder, CD portable player/recorder, memory type audio apparatus (audio apparatus using a memory card), etc., personal computer, mobile communication apparatuses such as a mobile phone, pocket or portable telephone etc., or the like have been miniaturized more and more in their external configurations or shapes and dimensions or sizes, and accordingly, an input terminals and/or output terminals built in or mounted to these electronic apparatuses have been also miniaturized. Particularly, in recent years, with the advance of optical connector mounted on thereto as an optical signal input terminal for receiving an optical or light digital signal or an optical signal output terminals for outputting an optical connector to the optical cable.

An optical connector mounted to any one of various electronic apparatuses and appliances has a light receiving element or light emitting element housed in the connector body thereof, and for instance, one of two optical plugs mounted to an optical cable at opposed ends thereof respectively, that transmits an optical or light digital signal is directly plugged in the optical connector, so that an optical digital signal is transmitted from the optical cable to the optical connector or from the optical connector to the optical cable.

As shown in U.S. Pat. Nos. 6,475,001 and 6,588,947, a conventional audio jack usually comprises a shielding shell for avoiding the Electro Magnetic Interference (EMI). However, this kind of shielding shell can not enclose the whole connector, U.S. Pat. No. 6,050,854 provides another kind of the audio jack. The audio jack comprises a shielding shell can enclose the upper face, the back face and the lateral face of the connector. A pair of grounding tabs extend forwardly and downwardly from a front side of the shielding shell. The grounding tabs abut against a metal enclosure after the audio jack is installed in a personal computer for promptly directing noise to the metal enclosure. Obviously, the shielding shell of such a structure takes a big size on the printed circuit board along a front-to-back direction.

Hence, it is desirable to have an optical-electric connector with an improved shielding shell to overcome the above-mentioned disadvantages of the prior art.

SUMMARY OF THE INVENTION

It is an object of the present invention to provide an optical-electric connector with a shielding shell for obtaining better anti-EMI effectiveness and occupying less space.

In order to achieve the above-mentioned object, an optical-connector comprises an insulating housing, a plurality of terminals, an optical-connector and shielding shell, the insulating housing defines a mating face having a mating hole thereon, a receiving room communicating with the mating hole and a plurality of terminal slots, the terminals are received in the terminal slots of the insulating housing, the optical-electric converter assembled in the insulating housing, the shielding shell substantially encloses the insulating housing and comprises a grounding tab extending from an upper face thereof.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
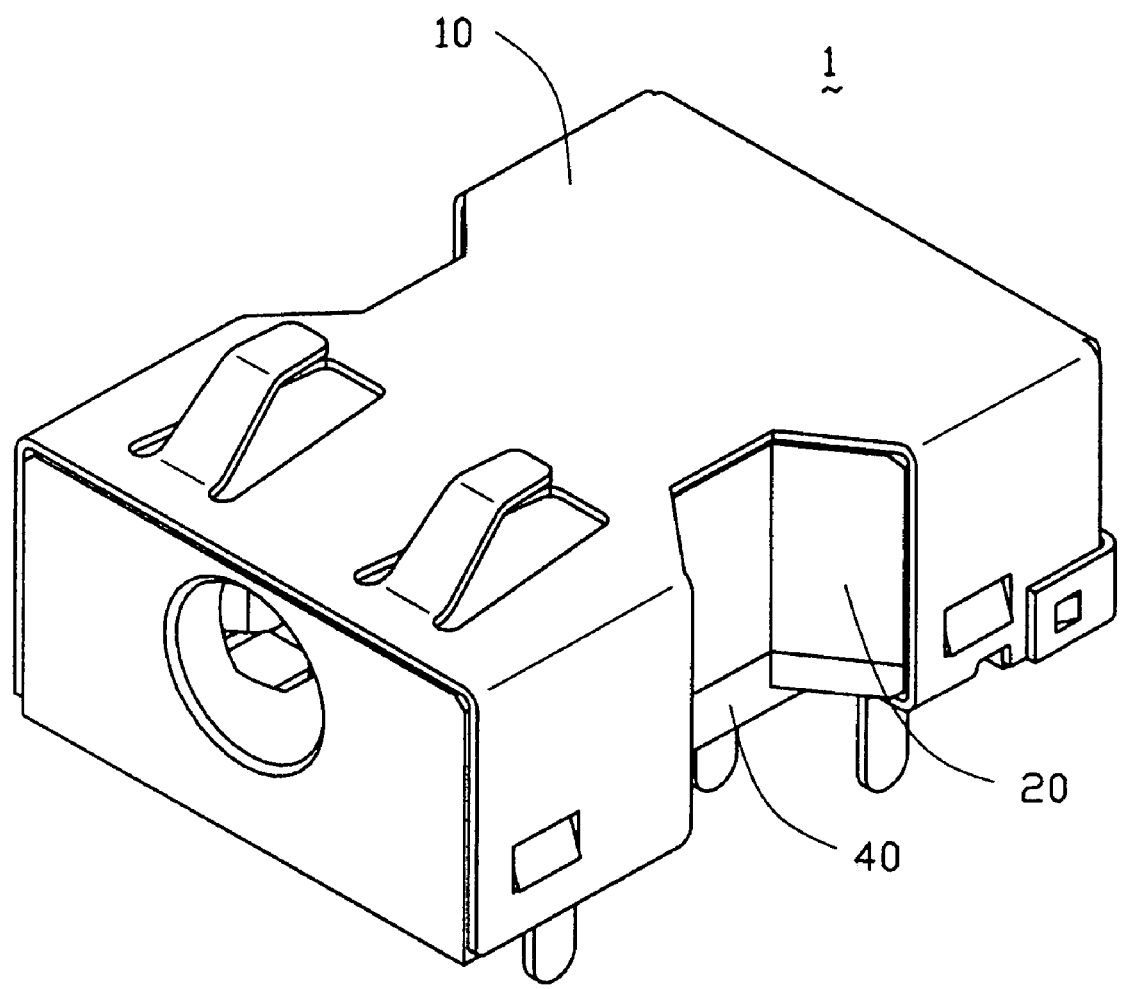
FIG. 1 is a perspective view of an optical-electric connector in accordance with the present invention.

Reference will now be made to the drawing figures to describe the present invention in detail.

With reference to FIGS. 1 to 4, an optical-electric connector 1 in accordance with the present invention is a straight-shaped jack connector 1 and comprises an insulating housing 20, a plurality of contacts 30 received in the insulating housing 20, a retainer 40, an optical-electric converter 50 and a shielding shell 10 assembled on the housing 20.

The shielding shell 10 comprises a flat portion 11, two pairs of lateral plates 13 extending downwardly from the opposed ends of the flat portion 11, and a rear portion (not labeled) extending downwardly from a back end of the flat portion 11. A pair of resilient plate 12 curvedly extending upwardly and rearwardly from the flat portion 11 and has a contacting portion 120 at the distal end thereof. Each lateral plate 13 defines a retaining hole 14 thereon. The lateral plate 13 at a back side of the flat portion 11 has a supporting portion 15 extending horizontally from a bottom side thereof and a tab 151 extending downwardly from the supporting portion 15.

Figure 2:
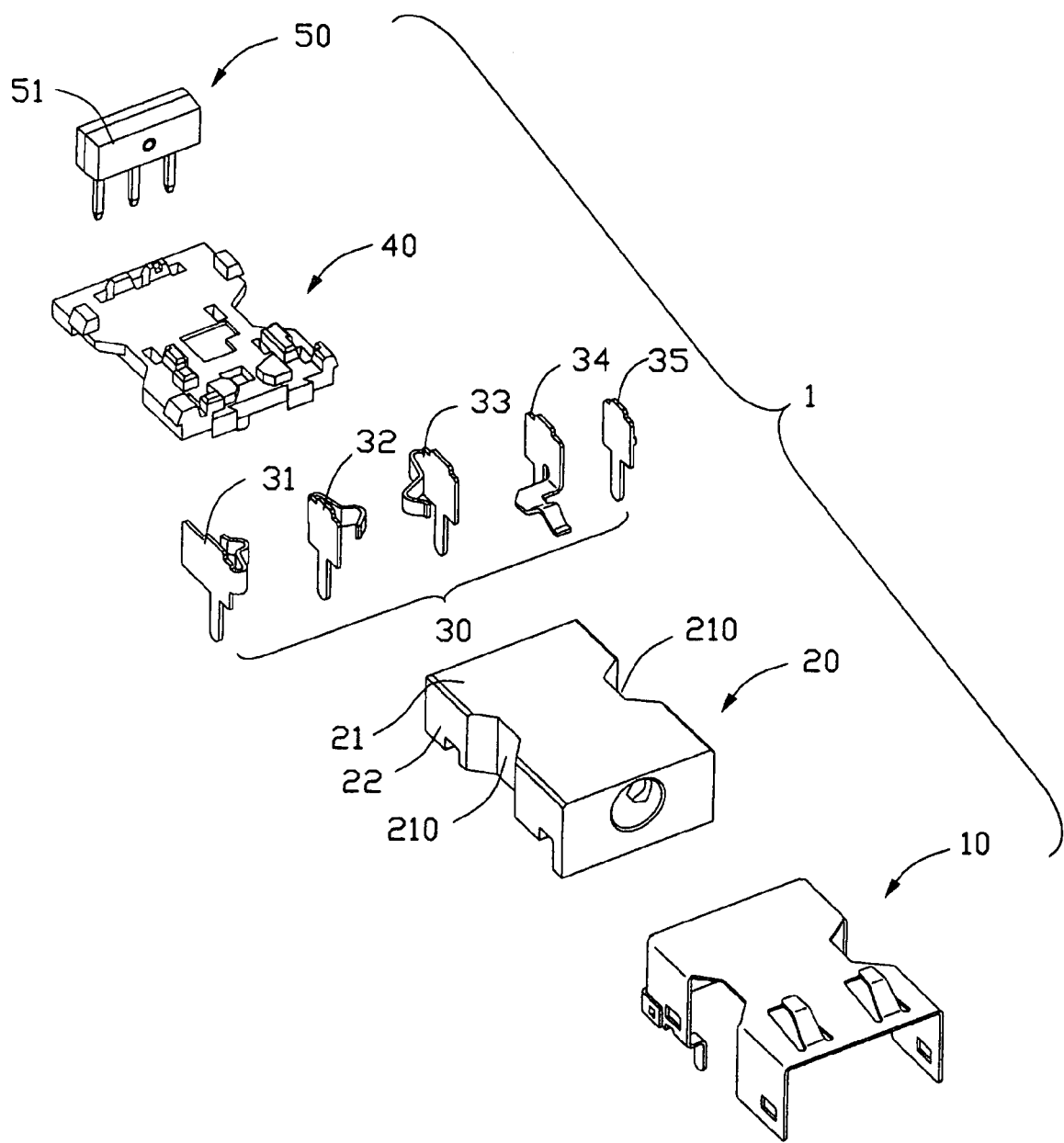
FIG. 2 is an exploded, perspective view of the optical-electric connector of FIG. 1.
Figure 3:
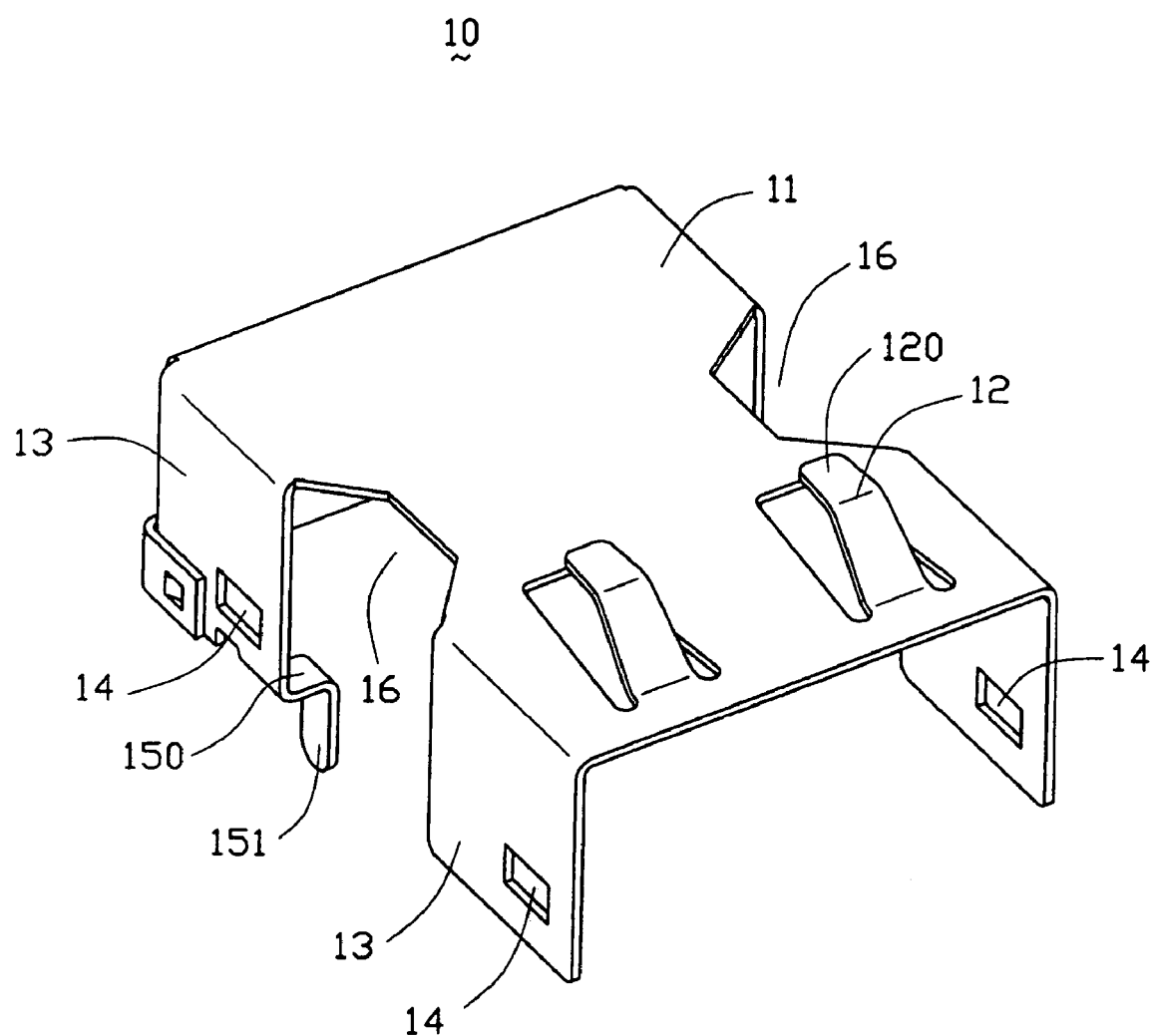
FIG. 3 is a perspective view of a shielding shell of the optical-electric connector.
Figure 4:
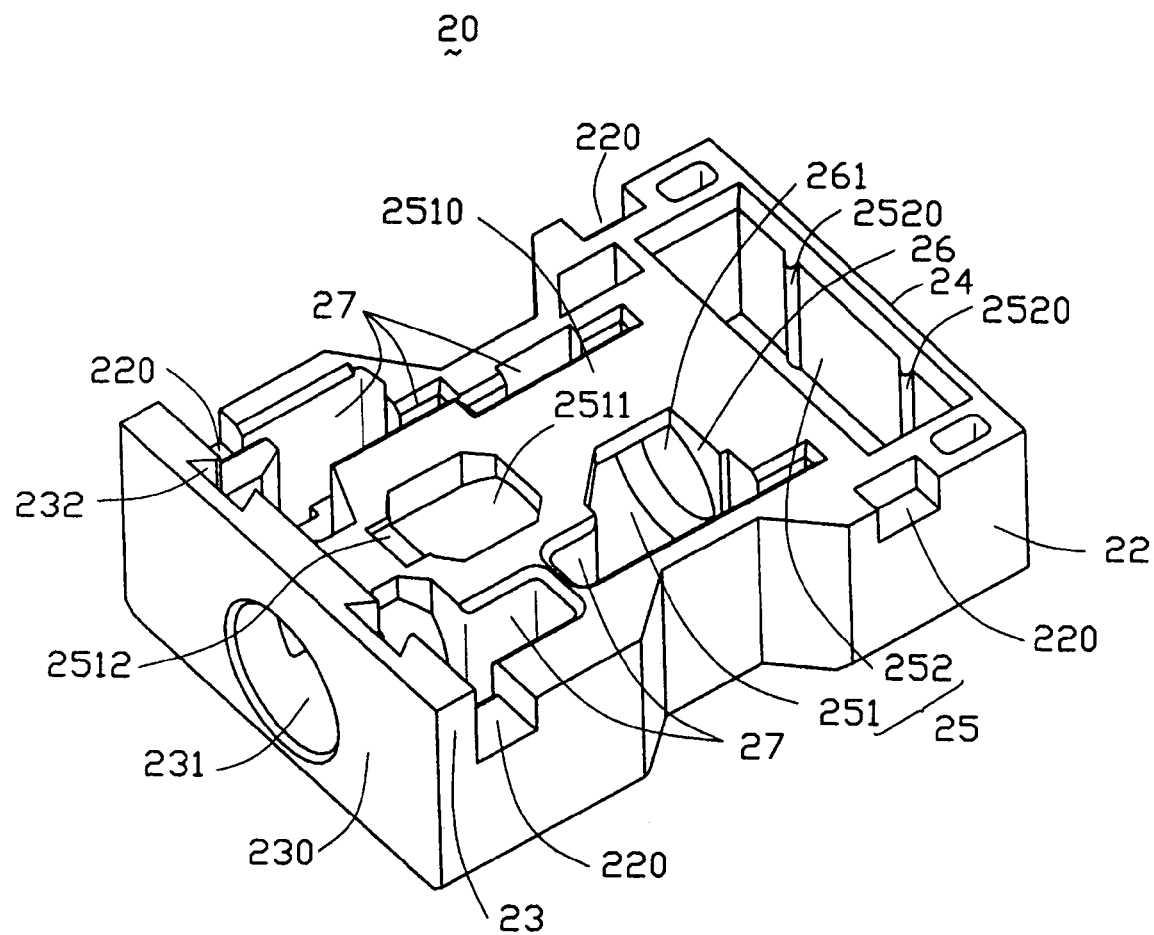
FIG. 4 is a perspective view of an insulating housing of the optical-electric connector.

With reference to FIG. 4 in conjunction with FIG. 2, the insulating housing 20 comprises an upper wall 21, a pair of side walls 22 extending downwardly from the upper wall 21, a front wall 23 extending downwardly from a front edge of the upper wall 21, and a rear wall 24 extending from a back edge of the upper wall 21, A pair of depressed portions 210 are formed at the center of the side walls 21, respectively. Each side wall 22 defines a pair of cutouts 220 thereof corresponding to the retaining holes 14 of the shielding shell 10. The front wall 23 is higher than the rear wall 24 and defines a mating hole 231 therethrough for insertion of a mating plug (not shown). The front wall 23 comprises a mating face 230 for mating with the plug and a pair of swallow-slots 232 at an inner face thereof. The insulating housing 20 comprises a receiving room 25 which is divided into a front receiving room 251 and a rear receiving room 252 by a separating portion 26. A connecting hole 261 is formed on the separating portion 26 in a position aligning with the mating hole 231 of the front wall 23. A plurality of terminal slots 27 are formed near to the two sides of the front receiving room 251 and communicate with the front receiving room 251. A connecting plate 2510 is formed between the front wall 23 and the separating portion 26 and extends across the front receiving room 251. The connecting plate 2510 defines a recess 2511 and a rectangular notch 2512 next to the recess 2511. The rear wall 24 of the insulating housing 20 comprises a pair of guiding portions 2520 at an inner face thereof.

With reference to FIG. 2, the terminals 30 are assembled to corresponding terminal slots 27 and include four resilient terminals 31, 32, 33, 34 and a retaining terminal 35. Each of the resilient terminals 31, 32, 33, 34 has a resilient arm (not labeled) extending into the front receiving room 251 of the insulating housing 20. The resilient terminal 33 and the retaining terminal 35 can be electrically connected or spaced like a switch.

Figure 5:
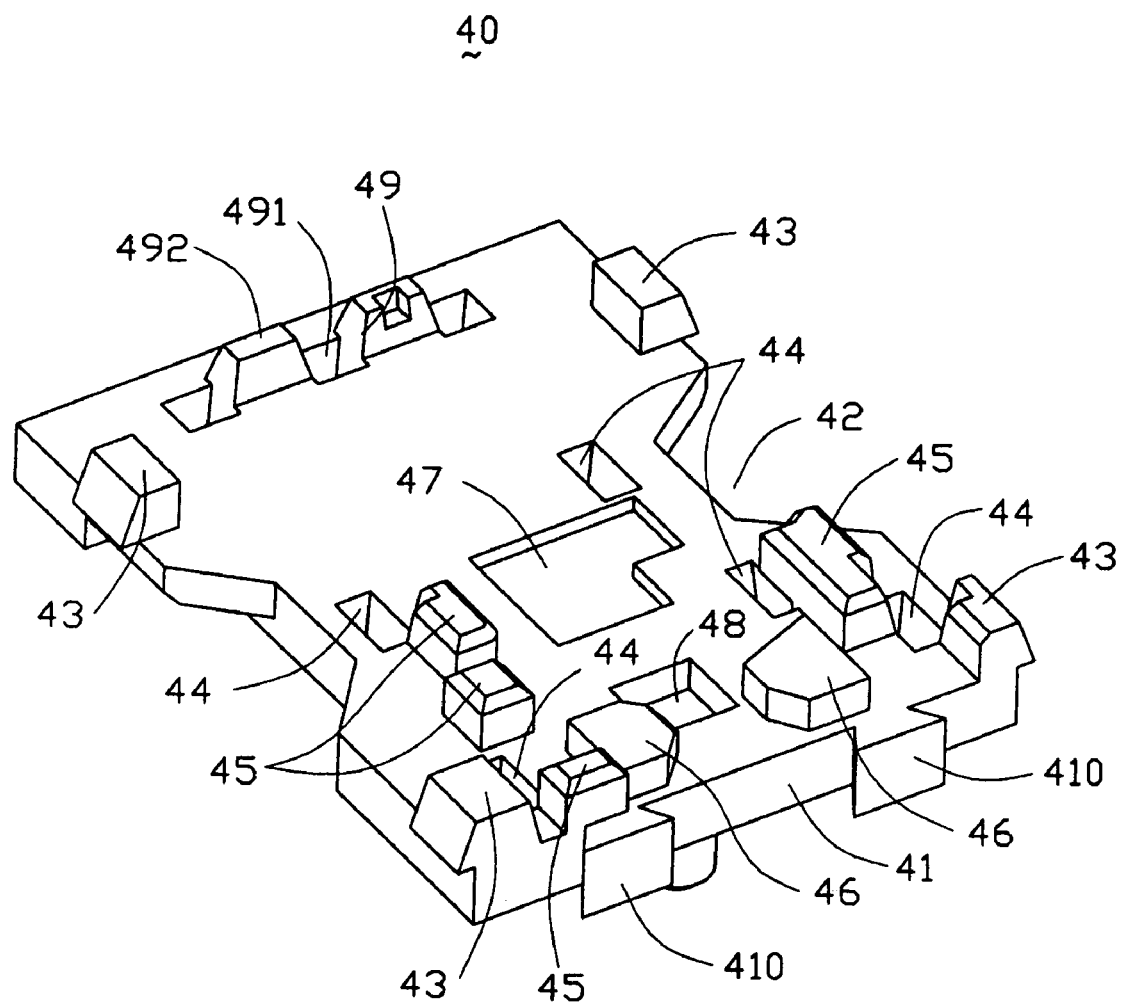
FIG. 5 is a perspective view of a retainer of the optical-electric connector.
Figure 6:
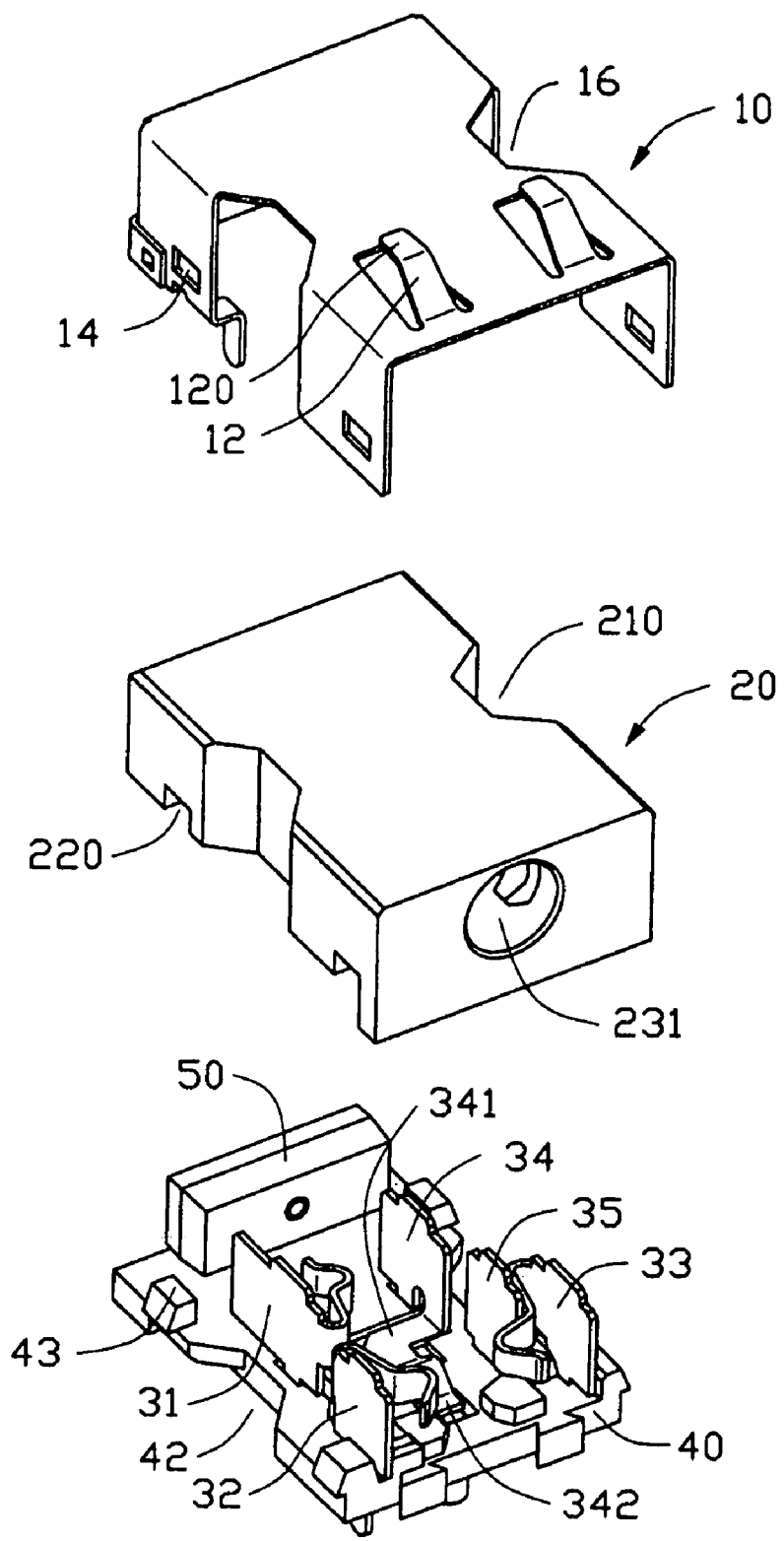
FIG. 6 is a partially assembled view of the optical-connector.

With reference to FIGS. 5–6, the retainer 40 has a front face 41 with a pair of swallow-blocks 410 thereon for being received in the swallow-slots 232 on the insulating housing 20. The lateral edges of the retainer 40 define a plurality of protrusions 43 for being received in the cutouts 220 of the insulating housing 12. A plurality of passageways 44 is defined on the retainer 40 for retaining corresponding terminals 30. A plurality of limiting blocks 45 and a plurality of supporting blocks 46 are formed near the passageways 44 for properly positioning the retainer 40 with respect to the housing 10. A gap 47 configured in a letter "L" is defined in the center of the retainer 40 and a rectangular gap 48 is formed at the front of the gap 47. The L-shaped gap 47 and the rectangular gap 48 are used to receive the resilient arm and a free end 341 of the resilient terminal 34, reference to FIG. 6. The retainer 40 defines a receiving portion 49 for receiving the optical-electric converter 50. The receiving portion 49 comprises three plugging holes 491 and a pair of retaining blocks 492 formed between the plugging holes 491. The retainer 40 comprises a pair of depressions defined on opposite edges thereof corresponding to the depressed portions 210 of the insulating housing 20.

For better showing the relationship between the members of the connector, the terminals 30 and the optical-converter 50 is assembled on the retainer 40. Actually, the terminals 30 are first received in the corresponding terminal slots 27 of the insulative housing 20, the optical-electric converter 50 is assembled in the back receiving room 252, and then the retainer 40 is engaged into the insulating housing 20 in a down-to-up direction. The terminal slots 27 are big enough for receiving corresponding terminals 30, the supporting blocks 45 and the limiting blocks 46 on the retainer 40. The limiting blocks 46 limit the movement of the terminals 30. The supporting blocks 46 support the terminals 30 not to be curved while the plug is inserted into the connector 1. The protrusions 43 are received in the corresponding cutouts 220 of the insulating housing 20. Each terminal 30 extends into the corresponding passageway 44 and beyond the bottom face of insulating housing 20. The optical-converter 50 has a receiving end 51 (reference to FIG. 2) locating in a line with the connecting hole 261 of the separating portion 26 of the insulating housing 20 and a retaining structure (not shown) for engaging with the retaining blocks 492 of the retainer 40. The part terminals 30 and the optical-converter 50 beyond the bottom face of the insulative housing are soldered to the printed circuit board (not shown).

At last, the shielding shell 10 encloses the insulating housing 20 and the retainer 40. The shielding shell 10 has its retaining holes 14 engaging with the protrusions 43 of the retainer 40, meantime, the supporting portion 150 of the lateral plates 13 of the shielding shell 10 engages with the bottom face of the insulating housing 20 for supporting the insulating housing 20 and the retainer 40. The posts 151 of the lateral plates 13 are used to ensure the connector 1 on a right position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An optical-electric connector comprising:
    an insulating housing defining a mating face having a mating hole thereon, a receiving room communicating with the mating hole and a plurality of terminal slots;
    a plurality of terminals received in the terminal slots of the insulating housing:
    an optical-electric converter assembled in the insulating housing; and
    a shielding shell substantially enclosing the insulating housing and comprising a grounding tab extending from an upper face thereof;
    wherein the grounding tab extends rearwardly and upwardly, and comprises a contact portion at a distal end thereof;
    wherein the insulating housing comprises a pair of depressed portions at opposite lateral sides thereof, and the shielding shell defines a pair of depressions corresponding to the depressed portions of the insulating housing;
    a retainer assembled at a bottom of the insulating housing, the retainer comprising a plurality of passageways corresponding to the terminals slots and a receiving portion receiving the optical-converter;
    wherein the optical-electric converter comprises a receiving end, and the receiving portion of the retainer comprises a plugging hole for the optical-electric converter to extending therethrough and a retaining block.

2. The optical-electric connector as described in claim 1, wherein the insulating housing has a front wall comprising a block, and wherein the retainer comprises a slot receiving the block.

3. The optical-electric connector as described in claim 2, wherein the lateral wall of the insulating housing comprises a cutout, and the retainer defines a protrusion received in the cutout and extending beyond the insulative housing.

4. The optical-electric connector as described in claim 3, wherein the shielding shell comprises a flat portion and a pair of lateral plates extending from the flat portion, each lateral plate comprising a retaining hole engaging with the protrusion of the retainer.

5. The optical-electric connector as described in claim 4, wherein the insulating housing comprises a separating portion dividing the receiving room into a front receiving room and a rear receiving room, and the terminals are received in the front receiving room and the optical-electric connector is received in the rear receiving room.

6. An optical-electric connector comprising:
    an insulating housing defining a front mating face with a mating hole therein, a receiving room communicating with the mating hole and a plurality of terminal slots;
    a plurality of terminals upwardly inserted into the receiving room from a bottom opening of the housing and received in the terminal slots of the insulating housing;

an optical-electric component assembled in the insulating housing; and a retainer assembled to a bottom of said housing for not only sealing the bottom opening but also aligning tails of the terminals.

7. The connector as claimed in claim 6, wherein both said housing and said retainer are of a sandglass-like configuration from a top view.

8. The connector as claimed in claim 6, wherein a metallic shell encloses said housing.

9. The connector as claimed in claim 8, wherein both said housing and said metallic shell are of a sandglass-like configuration from a top view.

10. An optical-electric connector comprising:

an insulating housing defining a front mating face with a mating hole therein, a receiving room communicating with the mating hole and a plurality of terminal slots;

a plurality of terminals inserted into the receiving room and received in the terminal slots of the insulating housing;

an optical-electric component assembled in the insulating housing; and said housing is of a sandglass-like configuration from a top view.

11. The connector as claimed in claim 10, wherein said housing defines a bottom opening from which the terminals are inserted into the receiving room.

12. The connector as claimed in claim 10, wherein said sandglass-like configuration defines a pair of depressed portions on two sides under a condition that a portion of the receiving room is formed therebewteen.

13. The connector as claimed in claim 10, wherein a metallic shell encloses said housing and is of a similar sandglass-like configuration from the top view.

14. The connector as claimed in claim 13, wherein the metal shell defines a pair of side walls except on a narrowed waist portion.

\* \* \* \* \*